United States Patent
Essen et al.

(10) Patent No.: US 6,515,715 B1
(45) Date of Patent: Feb. 4, 2003

(54) METHOD AND SYSTEM FOR CODE PACKING IN A DIGITAL VIDEO SYSTEM

(75) Inventors: Sophie Essen, Cupertino, CA (US); Ren-Yuh Wang, Cupertino, CA (US)

(73) Assignee: Divio, Inc., Sunnyvale, CA (US)

( * ) Notice: Subject to any disclaimer, the term of this patent is extended or adjusted under 35 U.S.C. 154(b) by 0 days.

(21) Appl. No.: 09/382,142

(22) Filed: Sep. 27, 1999

Related U.S. Application Data

(63) Continuation-in-part of application No. 09/264,219, filed on Mar. 5, 1999, now abandoned.
(60) Provisional application No. 60/077,075, filed on Mar. 6, 1998.

(51) Int. Cl.[7] .......................... H04N 9/64; H04N 5/917
(52) U.S. Cl. ...................... 348/714; 348/716; 348/717; 386/111; 369/59.25
(58) Field of Search ................................. 348/714, 716, 348/717; 386/111; 725/92, 115, 145; 375/240.01, 240.03, 240.12, 240.18, 240.24; 369/47.15, 47.21, 59.1, 59.23, 59.25

(56) References Cited

U.S. PATENT DOCUMENTS

| | | | | |
|---|---|---|---|---|
| 5,140,437 A | * | 8/1992 | Yonemitsu et al. | 358/342 |
| 5,585,845 A | * | 12/1996 | Kawamura et al. | 348/231 |
| 5,680,266 A | * | 10/1997 | Park | 360/48 |
| 5,781,690 A | * | 7/1998 | Juri et al. | 386/111 |
| 5,848,038 A | * | 12/1998 | Igarashi | 369/54 |
| 5,852,706 A | * | 12/1998 | Ogikubo et al. | 386/111 |
| 5,915,263 A | * | 6/1999 | Maeda | 711/154 |
| 6,424,385 B1 | * | 7/2002 | Koyama et al. | 348/734 |

* cited by examiner

*Primary Examiner*—John Miller
*Assistant Examiner*—Annan Shang
(74) *Attorney, Agent, or Firm*—Townsend and Townsend and Crew LLP

(57) ABSTRACT

New and improved methods and apparatus for code packing in a digital video system. Among others, a method of transferring a data block to a storage device is disclosed. The storage device can include a plurality of compartments. The method includes receiving a plurality of length values. Each length value can correspond to a data block from a plurality of data blocks. The method further includes filling a first compartment of the storage device with a portion of data from a first data block, searching the length values to identify one of the plurality of data blocks having a length value less than a threshold value, and filling a second compartment with a remaining portion of the data from the first data block. In one embodiment, the second compartment can correspond to the identified data block.

12 Claims, 7 Drawing Sheets

METHOD AND SYSTEM FOR CODE PACKING IN A DIGITAL VIDEO SYSTEM

CROSS-REFERENCES TO RELATED APPLICATIONS

This patent application is a continuation-in-part of and claims priority from U.S. patent application Ser. No. 09/264,219, entitled "METHOD AND SYSTEM FOR CODE PACKING IN A DIGITAL VIDEO SYSTEM," filed Mar. 5, 1999, now abandoned, which claims priority from U.S. Provisional Patent Application No. 60/077,075, entitled "METHOD AND APPARATUS FOR CODE PACKING IN A DIGITAL VIDEO SYSTEM," filed Mar. 6, 1998, the disclosures of which are incorporated herein by reference.

BACKGROUND OF THE INVENTION

The present invention relates generally to code packing in a digital video system and more particularly to the arrangement of compressed video segment data in a storage device.

Over the past few years, digital technology has been used with cellular telephones, cameras, and video recorders. In particular, handheld video recorders store a number of frames in a particular sequence for playback at a later time. The sequence of frames collectively form a video signal. The video signal is generally converted from analog to digital using an analog to digital converter to produce a digital video signal. Digital video signals can be divided into a number of video segments. A video segment may be made up of a number of pixel values.

FIG. 1 illustrates the arrangement of compressed video segment data in a storage device using the Digital Video Standard. Storage device 100 describes a memory space that is used to store the compressed video segment data. Storage device 100 has five macro-blocks indicated as MB101, MB102, MB103, MB104, and MB105. Each macro-block has six blocks designated as block 101a, block 101b, block 101c, block 101d, block 101e, and block 101f. Blocks 101a, 101b, 101c, and 101d each have a memory storage capacity of 14 bytes. Each 14 byte block represents an eight by eight matrix that stores sixty-four pixel values (see FIG. 2). Arrows in FIG. 2 illustrate an order for reading pixel values. Those with ordinary skill in the art would understand that pixels can be read in different orders. Blocks 101e and 101f each have a memory storage capacity of 10 bytes. Each 10 byte block represents an eight by eight matrix storing sixty-four pixel values. Each pixel value may be represented using a number of bits (e.g., 8 bits).

The Digital Video ("DV") specification, defined by the "DV Standard" or "Blue Book" Standard, describes the arrangement algorithm for a video segment into a storage device. The DV Standard is included herein by reference in its entirety and for all purposes. The DV specification has documented the arrangement algorithm of a video segment into a storage device which requires three passes. Arranging a video segment using three passes indicates that three loops are required to pack each video segment into a designated location (e.g., memory, buffer). Typically, the video data is compressed and then packed into the designated location.

During pass one, compressed data is packed into a macro-block, e.g., MB101. The packing is accomplished by filling the first block, e.g., block 101a, with compressed data. Two results may arise when filling a single block. First, the compressed data may completely fit into the block. That is, all the compressed data can be stored in the first block and the block is terminated with an end of block ("EOB") token 106. A block that can hold all the compressed data is referred to as a finished block. Second, the compressed data may not completely fit into a block. Hence, there is some overflow data from the same block. In this situation, the compressed data may completely fill the block and the remaining overflow data could not be stored in the block. The overflow data will be stored in a separate memory and will not be stored into the memory block until pass two or pass three. Each block having overflow data is referred to as an unfinished block. After block 101a is packed, block 101b, block 101c, block 101d, block 101e, and block 101f are packed successively. After the first macro-block MB101 is filled, that is blocks 101a through 101f are either filled with an EOB token 106 or completely filled and having additional overflow data stored in separate memory, macro-block 102, macro-block 103, macro-block 104, and macro-block 105, are filled in the same manner as macro-block 101. For each block, all the compressed overflow data is stored in the separate memory until pass two or pass three.

In pass two, the overflow data from macro-block 101 is retrieved from the separate memory. The overflow data from macro-block 101 is filled into a finished block in the same macro-block, that is macro-block 101. All the overflow data from macro-block 101 is filled into the finished blocks in macro-block 101. For example, consider the first macro-block 101. Blocks 101a, 101c, 101d, and 101e are unfinished blocks and blocks 101b and 101f are finished blocks with extra storage space available to hold additional overflow data. During pass two, the overflow data from block 101a is first used to fill block 101b and then used to fill block 101f. If there is still additional overflow data from block 101a after blocks 101b and 101f are completely filled, the overflow data remains in the separate memory until pass three. Pass two is limited to a single macro-block, e.g., macro-block 101. Hence, the overflow data from unfinished blocks of macro-blocks 101, 102, 103, 104, and 105 are filled into the finished block of macro-block 101, 102, 103, 104, and 105, respectively.

For pass three, the remaining overflow data stored in memory, that is the overflow data that was not removed from the separate memory during pass two, will be filled into the first available block. That is, during pass three, the overflow data is stored into a block even if the block is in a different macro-block. For example, overflow data from block 104d is filled into the first available block, which can be block 105d.

Arranging compressed video segment data using three passes requires extra memory for overflow data resulting from pass one and pass two so that the overflow data can be filled in a later pass, such as pass two and pass three.

SUMMARY OF THE INVENTION

The present invention relates to new and improved methods and apparatus for code packing in a digital video system. Among others, a method of transferring a data block to a storage device is disclosed. The storage device can include a plurality of compartments. The method includes receiving a plurality of length values. Each length value can correspond to a data block from a plurality of data blocks. The method further includes filling a first compartment of the storage device with a portion of data from a first data block, searching the length values to identify one of the plurality of data blocks having a length value less than a threshold value, and filling a second compartment with a remaining portion of the data from the first data block. In one embodiment, the second compartment can correspond to the identified data block.

In separate alternate embodiments, the method can further comprise filling a second compartment of the storage device with either a portion or an entire portion of data from a second data block. In another embodiment, the threshold value defines the storage capacity of at least one of the plurality of compartments.

In yet another embodiment, a compression module compresses video segment data and transfers the compressed video segment data to a code packing module. The code packing module arranges the compressed video segment data in a storage device such as a memory. The code packing module can arrange and store the compressed video segment data into a number of compartments in the storage device. In one embodiment, the compressed video segment data can be divided into five macro-blocks. Each macro-blocks can be divided into a number of blocks, e.g., six blocks. An encoder determines and transmits a length value for each of the blocks to the code packing module. The length value can represent the amount of compressed video segment data that can be stored in a particular block. Alternatively, the length value can represent the amount of compressed video segment data that is stored in a particular block. The code packing module fills a first compartment of the storage device with at least a portion of the data from a first block. If all the data from the first block can be stored in the first compartment then a second block of data is arranged and stored in a second compartment. If all the data from the first block cannot be stored in the first compartment, then the code packing module searches the length values to identify one of the data blocks having a length value less than a threshold value.

In a further embodiment, the threshold value can be the storage capacity of at least one of the compartments in the storage device. Furthermore, one or more threshold values can be used for the storage device.

In yet a further embodiment, the second compartment can correspond to the identified data block. In another embodiment, the compartments in the storage device can be arranged in a similar manner as the compressed data blocks.

Advantages of the invention include eliminating the need to store the overflow data in a separate memory. Further, one aspect of the invention provides for the arrangement of a video segment in a single pass thereby reducing the amount of time required to pack a video segment. Additionally, the invention has enhanced efficiency and requires less hardware to pack a video segment. Also, shared hardware can be used to calculate the overflow data, underflow data, and pointers to various locations in a particular compartment.

A further understanding of the nature and advantages of the invention herein may be realized by reference to the remaining portions of the specification and the attached drawings.

DESCRIPTION OF THE SPECIFIC EMBODIMENTS

In the description that follows, the present invention will be described in reference to a preferred embodiment for code packing. In particular, examples will be described which illustrate particular features of the invention. The present invention, however, is not limited to any particular features nor limited by the examples described herein. Therefore, the description of the embodiments that follow are for purposes of illustration and not limitation.

Figures 1, 2:
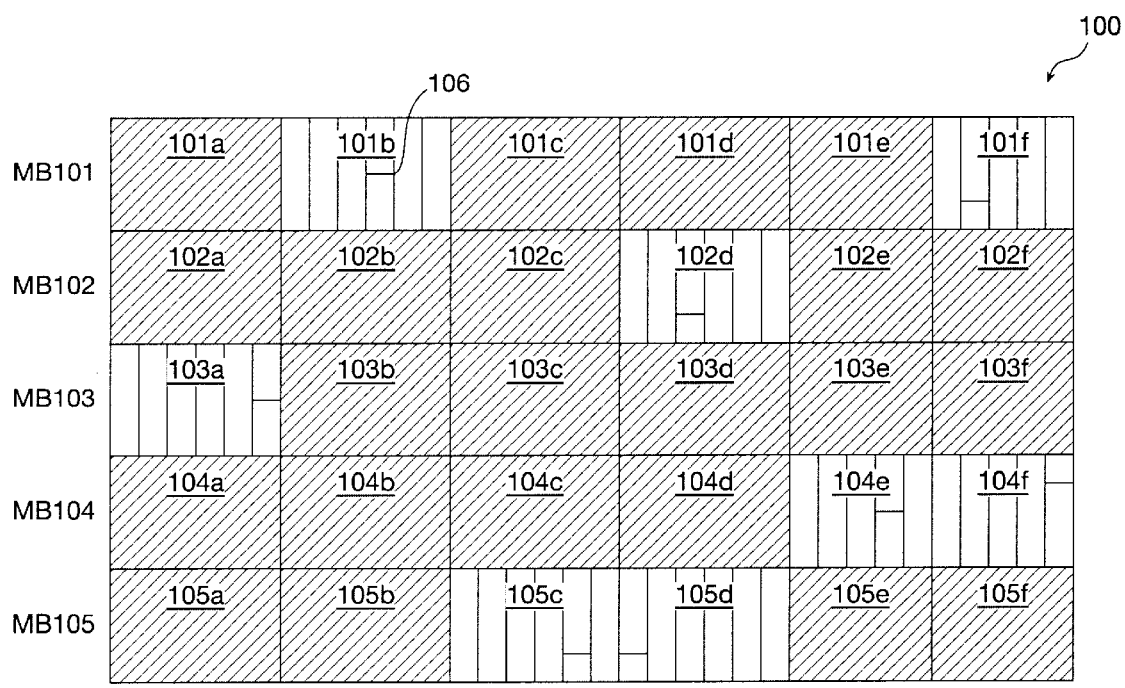
FIG. 1 illustrates the arrangement of compressed video segment data in a storage device using the Digital Video Standard.
FIG. 2 illustrates an eight by eight matrix for storing pixel values.
Figure 3:
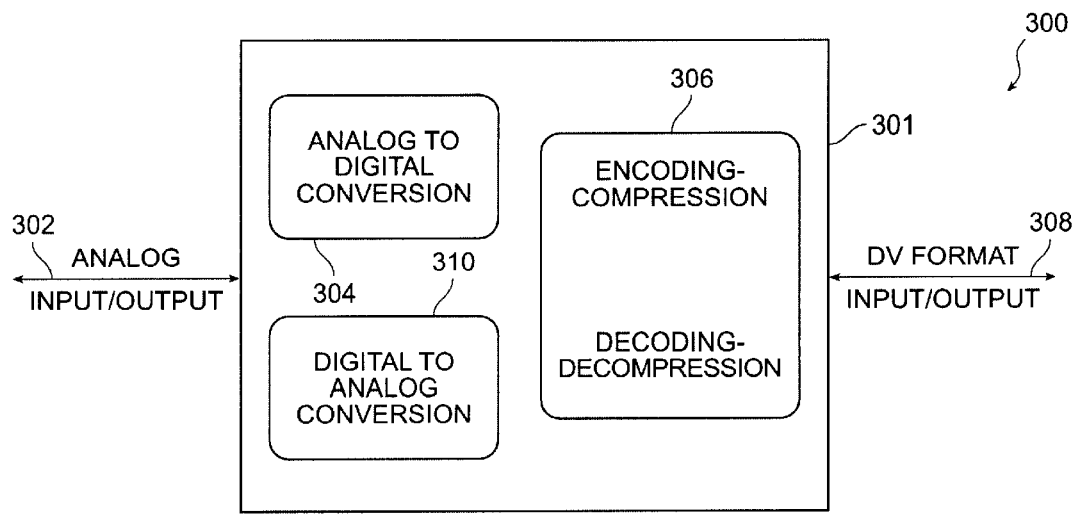
FIG. 3 illustrates a simplified block diagram of a system 300 in accordance with the present invention.

FIG. 3 illustrates a simplified block diagram of a system 300 in accordance with the present invention. Block 301 converts analog data into DV format data, and vice versa. Analog data is input and output at an analog node 302. DV data is input and output at a DV node 308. The analog signals can include those for cable TV, analog camcorders, video cassette recorders, and other analog sources. The DV format data can include those for digital DV camcorders, digital video editors, other DV format equipment, and other forms of storage such as memory in a PC, set atop boxes, WebTV®, and the like.

When converting analog data to DV format, an A/D converter 304 converts the analog data received at the analog node 302 to digital data. The digital data from the AID converter 304 is then input into a coding-compression block 306 for encoding and/or compression. The encoded/compressed data is then output at the DV node 308 in DV format.

When converting DV format data to analog data, DV format data is input into block 301 at the DV node 308. The DV format data is then decoded and/or decompressed by the coding-compression block 306. The decoded/decompressed data is then received by D/A converter 310 which converts the digital data to analog and then outputs the analog data at the analog node 302. Alternatively, blocks 304 and 310 can be implemented on the same chip or onto two separate chips.

Figure 4:
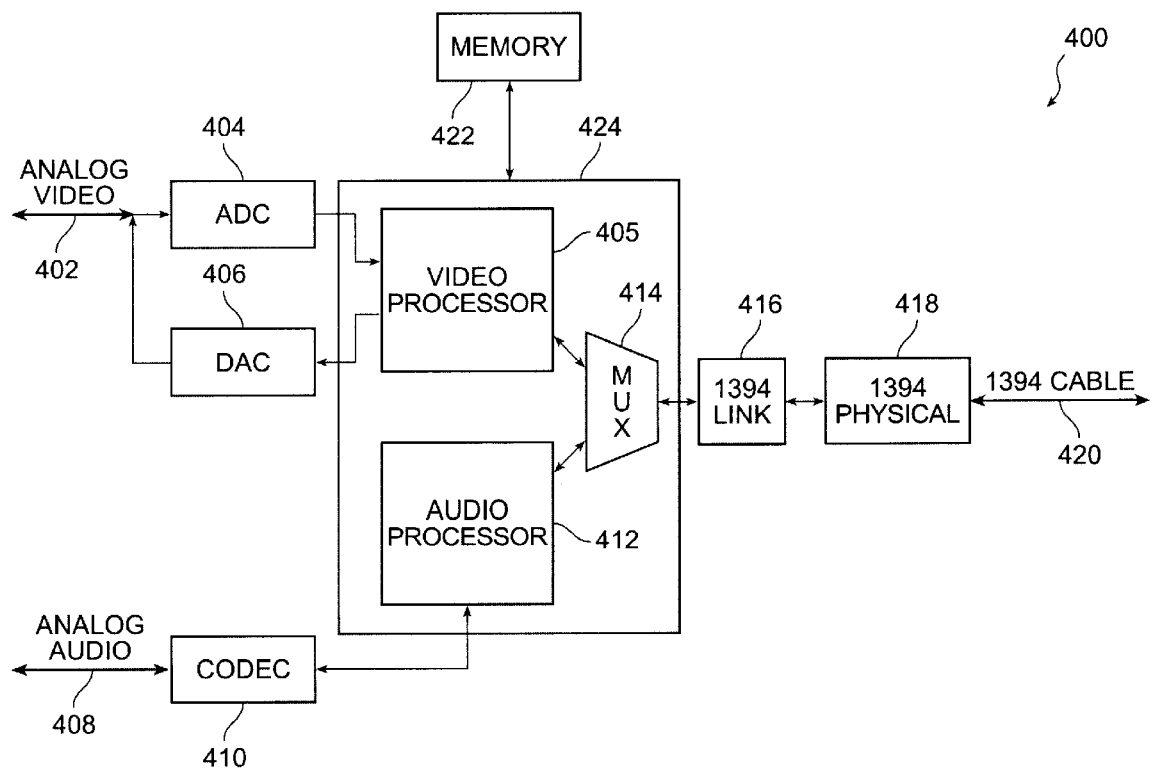
FIG. 4 illustrates a more detailed illustration of block 301 of FIG. 3.

FIG. 4 illustrates a system 400. The system 400 is a more detailed illustration of block 301 of FIG. 3. Analog video data is received at analog video node 402. The received data is then provided to an A/D converter 404 which converts the analog video data into a digital format. The digitized data from the A/D converter 404 is provided to a video processor 405 which performs video processing on the digitized video data. When outputting analog video data at the analog video node 402, a D/A converter 406 converts the digital analog video data from the video processor 405 into analog video data.

Audio data is received in analog format at an analog audio node 408. The analog audio data is provided to an audio converter 410. The audio converter 410 can convert analog audio data into digital format and vice versa. The audio converter 410 can be a Philips Electronics® UDA1344 or other suitable audio converter chips. The audio converter 410 is coupled to an audio processor 412. The audio processor 412 processes digital audio signals. The audio processor 412 can be any suitable audio processing chip such as digital signal processor (DSP) chips available from Texas Instruments®. A multiplexer 414 multiplexes data from/to the video processor 405 and the audio processor 412. The multiplexer 414 is coupled to a link chip 416. The link chip 416 is preferably a purely digital chip and provides a link layer for communication in accordance with 1394 standard originally designed by Apple Computer, Inc.® Currently, the 1394 standard can provide a bandwidth of 100 Mb/sec, 200, 400, or 800 Mb/sec. Other brands of link chips can also be used such as Texas Instruments® TSB12LV42 and Phillips Electronics® PD11394L21. The link chip 416 is coupled to physical layer 418 which provides a connection in accordance with the 1394 standard. The physical layer 418 is coupled to a cable 420 which is also designed in accordance with standard 1394. The cable 420 can also be an optical cable.

FIG. 4 also illustrates a memory 422 which can be any type of storage such as dynamic random access memory (DRAM), extended output DRAM (EDO DRAM), synchronous DRAM (SDRAM), video RAM (VRAM), static RAM (SRAM), and the like. The memory 422 provides storage for devices within system 400 including storage for functions performed within block 424, such as functions performed by the video processor 405 and the audio processor 412. Additionally, some elements of the system 400 can have their own local memory.

Figure 5:
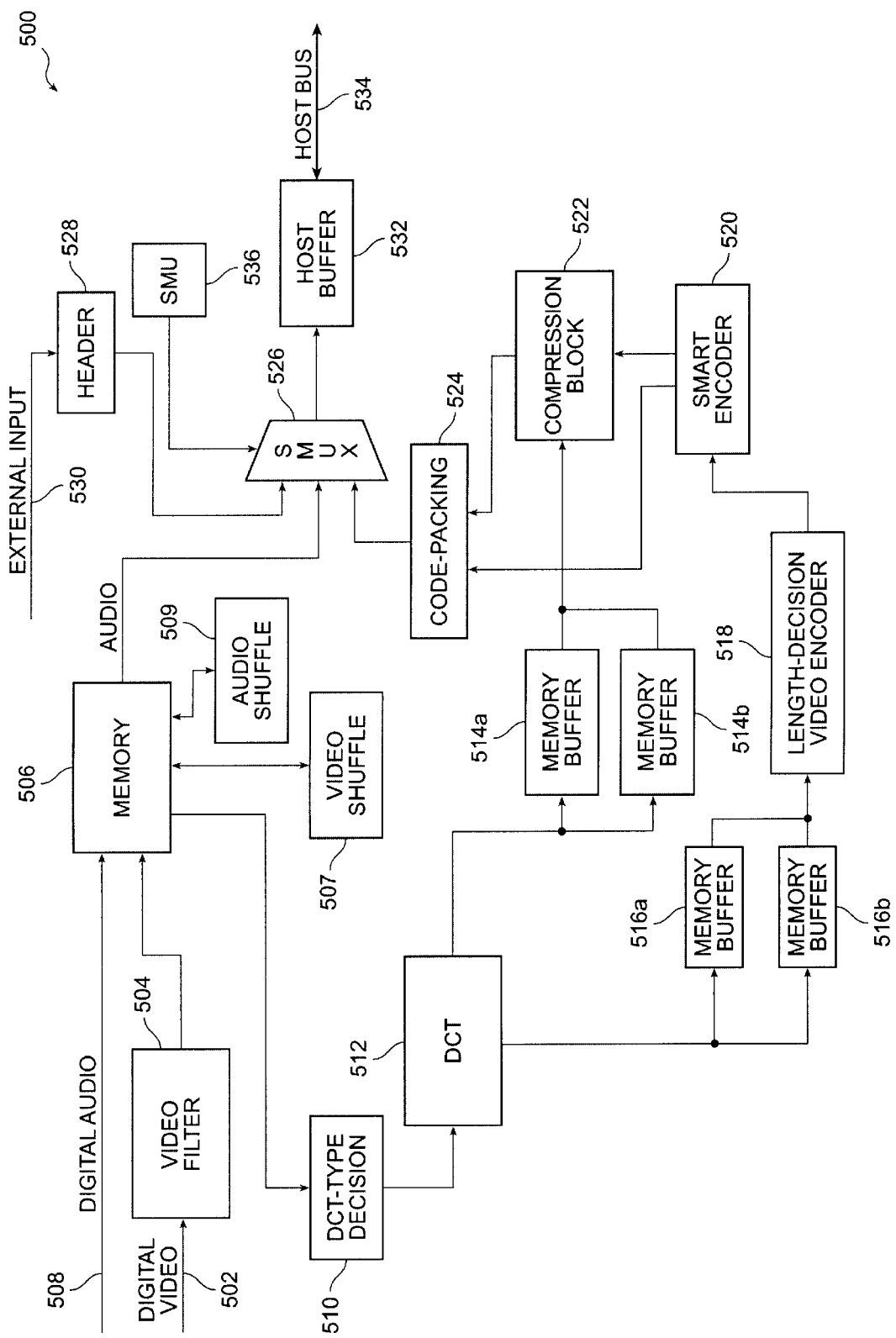
FIG. 5 illustrates a more detailed block diagram of the coding-compression block 306 of FIG. 3.

FIG. 5 illustrates a system 500. The system 500 is a more detailed block diagram of the coding-compression block 306 of FIG. 3. Digital video data is received at a video node 502. The received digital video data is preferably in 4:2:2 format, indicating four bytes of data for luminance (Y), two bytes of data for chrominance red (CR) and two bytes of data for chrominance blue (CB), respectively. The digital video data can be provided by any video decoder chip, such as Phillips Electronics® SAA7112. A video filter 504 performs filtering operations on the digital video data received at the video node 502. The filtering operations can include filtering for NTSC or PAL television system standards. For example, for NTSC the 4:2:2 format data can be filtered into 4:1:1 format.

For PAL, the 4:2:2 format data can be filtered into 4:2:0 format data. Other filtering operations by the video filter 504 can include horizontal and vertical filtering to remove noise. The filtered video data from the video filter 504 can be stored in a memory 506. The video data can be arranged by a video shuffle block 507 to store the video data more efficiently in the memory 506. The memory 506 can also store digital audio data received at an audio node 508. An audio shuffle block 509 can arrange the audio data more efficiently in the memory 506. The memory 506 can be any type of storage such as DRAM, EDO DRAM, SDRAM, VRAM, SRAM, and the like. The memory 506 provides storage for devices within the system 500. Additionally, some elements of the system 500 can have their own local memory.

The video data stored in memory 506 can be retrieved by DCT-type decision block 510. The DCT-type decision block 510 can determine whether 8×8 or 2×4×8 type DCT should be performed on the retrieved video data. The retrieved video data is then provided to a DCT block 512 which is configured to perform the discrete cosine transformation on the retrieved data. The DCT block 512 will perform the DCT operation on the retrieved data in accordance with the DCT-type decision made by the DCT-decision block 510. The transformed data from the DCT block 512 is stored in memory buffers 514a–b, 516a–b, and 525a–b. The memory buffers 514a–b can be identical. Similarly, the memory buffers 516a–b and 525a–b can be identical. The memory buffers 514a–b preferably store 1 k–20 bits of data. Memory buffers 516a–b preferably store 64×10 bits of data. Memory buffers 525a–b preferably store 200×16 bits of data. Such a configuration will allow storage of one video segment in each of the memory buffers 514a–b and 525a–b. As detailed above, each video segment includes five (5) macro blocks and each macro block includes six (6) blocks of 8×8 pixels. Also, such a configuration will permit the memory buffers 516a–b to each store one 8×8 block of DCT transformed data. The memory buffers 514a–b and 516a–b will act as back and forth memory buffers, i.e., each time one memory buffer is filled, incoming data will be stored in the other memory buffer. Similarly, when data is read from one memory, the other memory buffer is being filled. For example, with respect to the memory buffers 516a–b, if the $0^{th}$ 8×8 block is stored in the memory buffer 516a, the $1^{st}$ block of the 8×8 block data is stored in the memory buffer 516b. Similarly, the $2^{nd}$ 8×8 block is stored in the memory buffer 516a and the $3^{rd}$ 8×8 block of data is stored in the memory buffer 516b. The 8×8 blocks stored in the memory buffers 516a–b are input into a length-decision video encoder 518. The length-decision video encoder 518 receives the frequency-domain pixel information transformed by the DCT block 512.

In contrast with other types of compression techniques, DV video encoding incorporates a few dynamically adjusted parameters to help maintain the video compression ratio at around 5:1. These parameters include the DCT-type (8×8 or 2×4×8), class number (0, 1, 2, and 3), Quantization or Q factor (0–15), and limited selection of quantization factor (powers of 2, simplifying implementation). These parameters are related to both the spatial-domain information (before DCT) and the frequency-domain information (after DCT). The almost constant compression ratio requirement can be maintained by determining the appropriate compression factors before any actual compression is performed. For example, the length-decision video encoder 518 determines the length information necessary for variable length coding (VLC).

There are sixteen possible Q factors (also know as "Q-numbers"). The length-decision video encoder 518 determines the length information for the received data from the memory buffers 516a–b based on five out of the sixteen possible Q factors. The reason for choosing only five of the sixteen possible Q-numbers is to reduce the number of computations and comparisons. The length-decision video encoder 518 computes the length for each of the Q-numbers, which is then used to look up an encoded length from an encoding table. Preferably, the five Q-numbers used are 0, 3, 7, 11, and 15 to provide a more dynamic range of values.

After the length decision, the data is input to a smart encoder 520. The smart encoder 520 determines which Q factors would provide the best compression based on the length decision for each block of 8×8 data. The selected Q-numbers are provided to compression block 522 for application to video segments stored in the memory buffers 514a–b. The compression block 522 can also include a code-decision video encoder for variable length coding. The smart encoder 520 can also provide information to a code packing block 524. Such information can, for example, include length information, selected Q-numbers, class numbers, DCT-type, and the like. The length information includes data about length of data stored in each macro block. The code packing block 524 can receive the compressed data from compression block 522 and the macro block length information from smart encoder 520. The code packing block 524 arranges video data efficiently into a bitstream. The code packing block 524 is coupled to a system multiplexer 526. The system multiplexer 526 also receives audio data from the memory 506 and header information from a header block 528. The audio information can be from the audio node 508, and other sources of audio, such as audio overlays, editors, and the like. The header information can be input from outside the system. For example, external information such as close captioning, Tele-text, or different language subtitles, can be received from an external input 530.

The system multiplexer 526 arranges the outgoing data based on timing considerations to recreate real-time data in an appropriate order. The output of the system multiplexer 526 is coupled to a host buffer 532. The host buffer 532 is coupled to a host bus 534. The host buffer 532 ensures that data is buffered before it is provided to the host bus 534. Such a configuration will, for example, ensure that data will not be lost if the host bus is busy. The code packing block 524 can be coupled to the system multiplexer 526 through a pair of memory buffers similar to the memory buffers 514a–b (not shown). Such memory buffers would have a similar configuration, i.e., one would be read from while another is receiving data. The size of these memory buffers is preferably 385 bytes each. The system multiplexer unit 536 will provide control data to the system multiplexer 526 based on timing considerations to recreate real-time data flow in an appropriate order. Accordingly, the digital audio data received on the audio node 508 and the digital video data received on the video node 502 will be converted to DV format data by system 500 and output at node 534.

Figure 6:
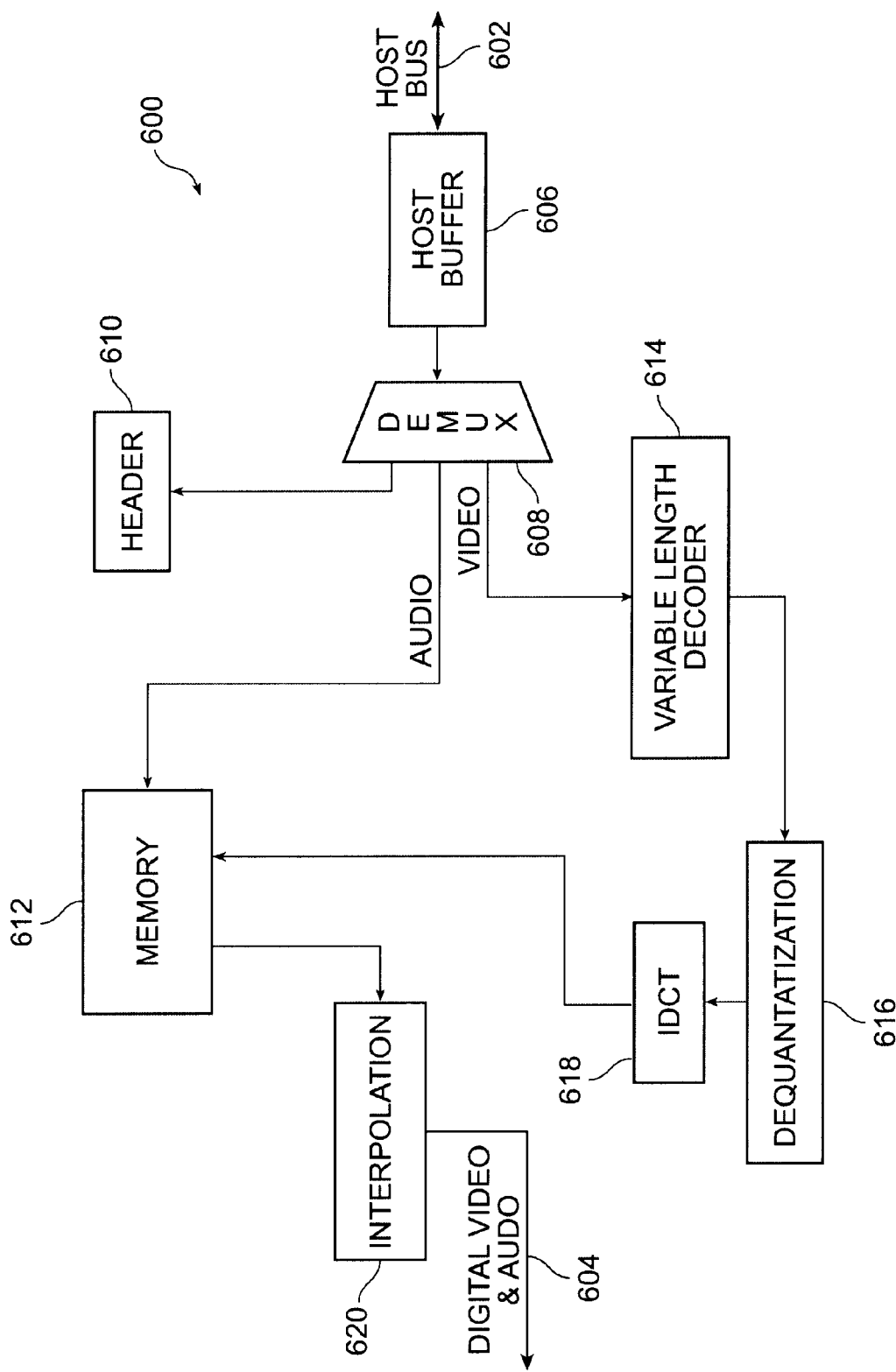
FIG. 6 illustrates a simplified block diagram of a system for converting DV data to digital data.

FIG. 6 illustrates a simplified block diagram of a system 600 for converting DV data received at a host node 602 to digital audio and video data which are respectively output at a digital audio node 603 and a digital video node 604. The DV data from the host node 602 is received by a host buffer 606. The host buffer 606 buffers the DV format data and provides the data to a demultiplexer 608. The demultiplexer 608 demultiplexes the DV data received from the host buffer 606 and provides header data to a header block 610, audio data to a memory 612, and video data to an unpacking block 613. The header data can be information such as close captioning, Tele-text, different language subtitles, and other data embedded in the DV format data. The memory 612 can be any type of storage such as DRAM, EDO DRAM, SDRAM, VRAM, SRAM, and the like. The memory 612 can also provide storage for devices within the system 600. Moreover, some elements of the system 600 can have their own local memory.

The unpacking block 613 is configured to convert the bitstream data to bitstreams for each video block and provide these unpacked blocks of data to a variable length decoder 614. The variable length decoder 614 decodes the DV video data in accordance with variable length decoding techniques. The output of variable length decoder 614 is coupled to a dequantization block 616 which dequantizes the DV bitstream in accordance with embedded dequantization factors. The dequantization block 616 is coupled to an inverse DCT (IDCT) block 618 which is configured to perform inverse discrete cosine transformation on the dequantized bitstream. The IDCT operation converts data from the frequency domain to the spatial domain. The spatial domain video data is then stored in the memory 612. A video shuffling block 620 retrieves the stored video data from the memory 612 and arranges the video data in an appropriate order if necessary. The video shuffling block 620 can also perform operations such as interpolation and filtering on the retrieved video data. For example, the video shuffling block 620 can perform a seven-tap horizontal filter which would convert a 4:1:1 format video data to a 4:2:2 format video data. Also, a three-tap vertical filter can be performed by the video shuffling block 620 to convert video data from 4:2:0 to 4:2:2 format. The output of the video shuffling block 620 can then be converted to analog format. At this stage, a chip such as Phillips Electronics® SAA7121 can be used to perform the conversion operations.

Similarly, an audio shuffling block 622 retrieves the stored audio data from the memory 612 and arranges the audio data in an appropriate order if necessary. The audio shuffling block 622 can also perform operations such as interpolation and filtering on the retrieved audio data. The output of the audio shuffling block 622 can then be converted to analog format. At this stage, a chip such as Phillips Electronics® UDA1344 can be used to perform the conversion operations.

Figure 7:
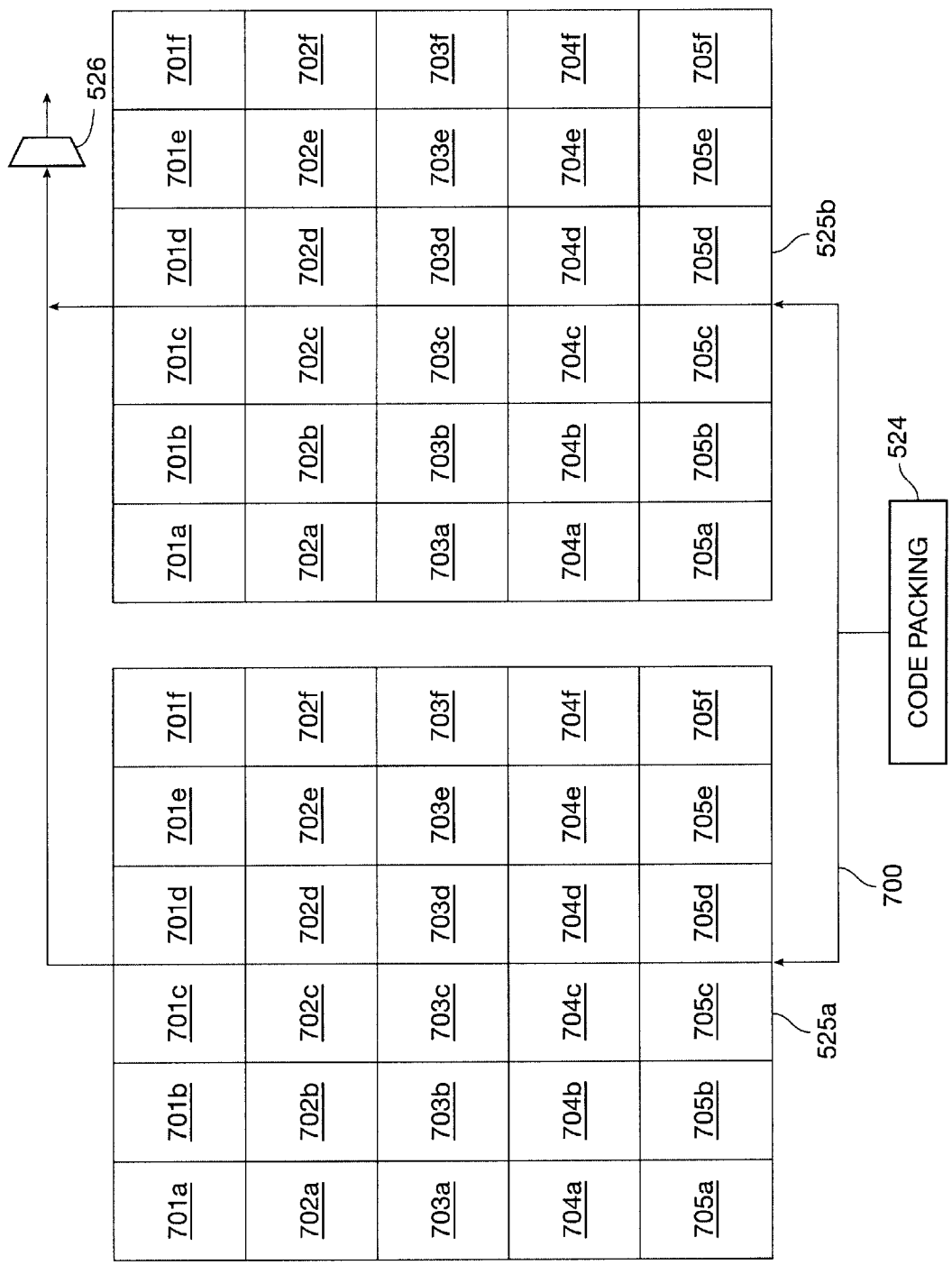
FIG. 7 illustrates a more detailed portion of FIG. 5 that depicts the storage device for the arrangement of compressed video segment data.

FIG. 7 illustrates a more detailed portion of FIG. 5 that depicts the storage device for the arrangement of compressed video segment data. Each block of compressed data is received by the code packing block 524. The code packing block 524 arranges and stores the compressed data in a storage device 525a–b such as a memory or a buffer. The arrangement of the compressed data is performed in one pass. Arranging the compressed data in one pass provides enhanced efficiency and less memory components. The one pass system eliminates the need for having a large separate memory for storing the overflow data. In addition, less time is required to arrange the data in the memory device 525a–b because the overflow data does not have to be stored and retrieved from a separate memory. The memory device 525a–b is connected to the code packing block 524 using a data bus 701. Those with ordinary skill in the art would understand that the data bus 701 can be any type of data transfer means.

Arranging the data in the memory device 525a–b begins by transferring a block of compressed data to the code packing block 524. Each block of data is passed to the code packing block 524 one at a time. Typically, the transfer of data is performed continuously, that is with minimal, if any, time delay between each block. Each block of compressed data can be arranged and stored in one or more compartments of the memory device 525a–b before the next block of compressed data is arranged and stored. For example, the compressed data for compartment 701a can be arranged and stored in the storage device 525a–b before the compressed data for compartment 701b is arranged and stored.

The code packing block 524 arranges the compressed video segment data into compartments of the storage device 525a–b. For example, the code packing block 524 can first pack the storage device 525a with compressed video segment data. After storage device 525a has been packed with data, the code packing block 524 can pack the storage device 525b with data. While the storage device 525b is being packed, the packed data from storage device 525a can be transferred to SMUX 526 (see also FIG. 5). Also, while storage device 525a is being packed, the packed data from storage device 525b can be transferred to SMUX 526 (see also FIG. 5).

The packing routine begins with the first compartment 701a. The code packing block 524 arranges and stores the first block of compressed data into compartment 701a. For simplicity, the blocks of compressed data will be numbered similar to the numbering of the compartments. For example, data block 701a transfers compressed data to compartment 701a.

If the first block of compressed data can be completely stored in compartment 701a, the compartment is referred to as a finished compartment and an EOB token (not shown)

can be used to indicate the end of the compartment. The remaining storage space in a finished compartments can be used for the storage of overflow data received from other unfinished compartments.

If the compressed data transferred to compartment 701*a* exceeds the storage capacity of compartment 701*a*, the overflow data is transferred to another compartment before the compressed data for the next compartment, e.g., compartment 701*b*, is transferred to and stored in memory device 525*a–b*. For example, if compartment 701*a* has overflow data, the code packing block 524 transfers the overflow data to another compartment before the data in block 701*b* is processed. The code packing block 524 determines which compartment to send the overflow data by using the length value of the compressed data blocks. The length value of each compressed data block can be determined by the smart encoder 520. Accordingly, in one embodiment, the length values can be determined prior to packing the compressed data. Alternatively, the length values can be determined as the compressed data is being packed. The smart encoder 520 can send the length value for each compressed data block to a memory located within the code packing block 524. The code packing block 524 searches the memory for a length value of a compressed data block indicating that additional storage space is available to store overflow data. Typically, this is accomplished by comparing the length value for each data block to a threshold value. Generally, the threshold value is the size of a completely filled compartment. Typically, the threshold value is 112 bits (14 bytes). Also, another threshold value can be 80 bits (10 bytes).

If the length value of a compressed data block is less than the threshold value then the compartment can store additional overflow data. Conversely, if the length value of a block is greater than or equal to the threshold value, then the compartment has been filled and cannot store additional overflow data. For example, if compartment 701*b* has overflow data, the code packing block 524 can compare the length of each compressed data block to the threshold value. The first data block having a length value less than the threshold value, for example data block 701*e*, can store the overflow data from compartment 701*b*. If the overflow data cannot completely fit into one additional compartment, the code packing block 524 searches for another available compartment by continuing to search the remaining length values. For example, if the data cannot fit into compartment 701*e*, the code packing block 524 continues searching the length values at data block 701*f* and so on. Hence, the overflow data can be transmitted to one or more compartments. The overflow data from a particular compartment can be stored in another compartment in a different macro-block or row. For instance, the overflow data from compartment 701*e* can be stored in compartment 705*f*. To determine where to fill the overflow data, the search routine continues through each compartment until a finished compartment has been located. Once the overflow data has been filled into an another compartment, for example compartment 701*e*, the code packing block 524 increments the length value in memory for the compartment that received the overflow data to reflect that additional data has been stored in that compartment. Pointer values can also be stored in memory that indicate the starting and ending point for a particular compartment of data in the storage device.

The length value can also provide the code packing block 524 with information as to where to fill the overflow data in a particular compartment. For example, the length value for block 701*e* can be used to indicate that the overflow data is to be filled into the storage space after the data reserved for compartment 701*e* is to be stored. For example, if compressed data from block 701*e* has a length value of 90 bits, the overflow data can be filled into compartment 701*e* beginning at bit 91. Even though the data for compartment 701*e* has not been filled yet, the storage space for compartment 701*e*'s compressed data can be reserved using the length value. After the compressed data corresponding to the first compartment is packed, the second block of compressed data can be transferred to the code packing block 524. The code-packing block 524 transfers the next block of compressed data to one or more compartments in the storage device 525*a–b*. Hence, all the compressed video segment data can be stored in the storage device 525*a* in a single pass.

Figure 8:
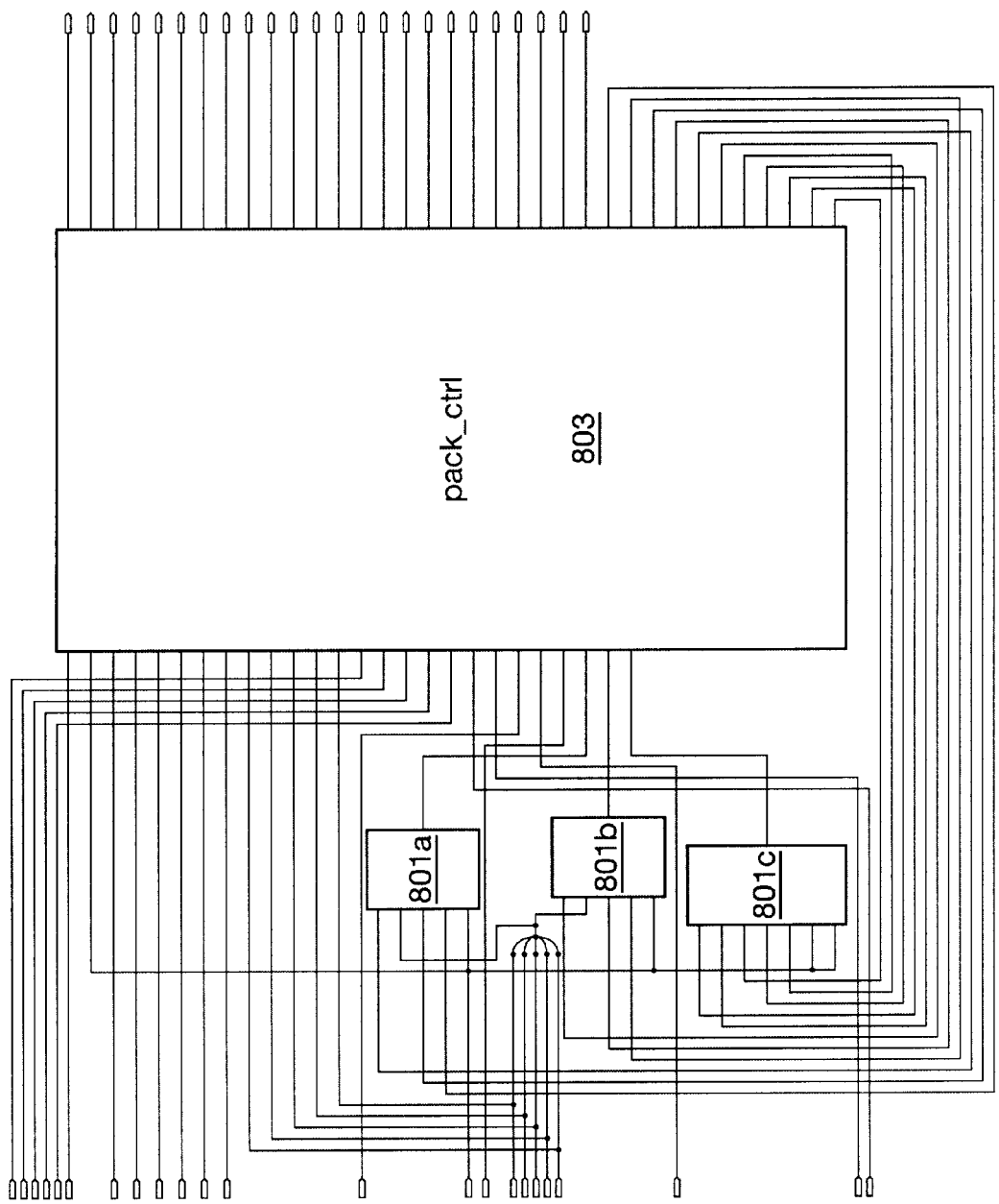
FIGS. 8 and 9 illustrate further details regarding embodiments of the present invention.
Figure 9:
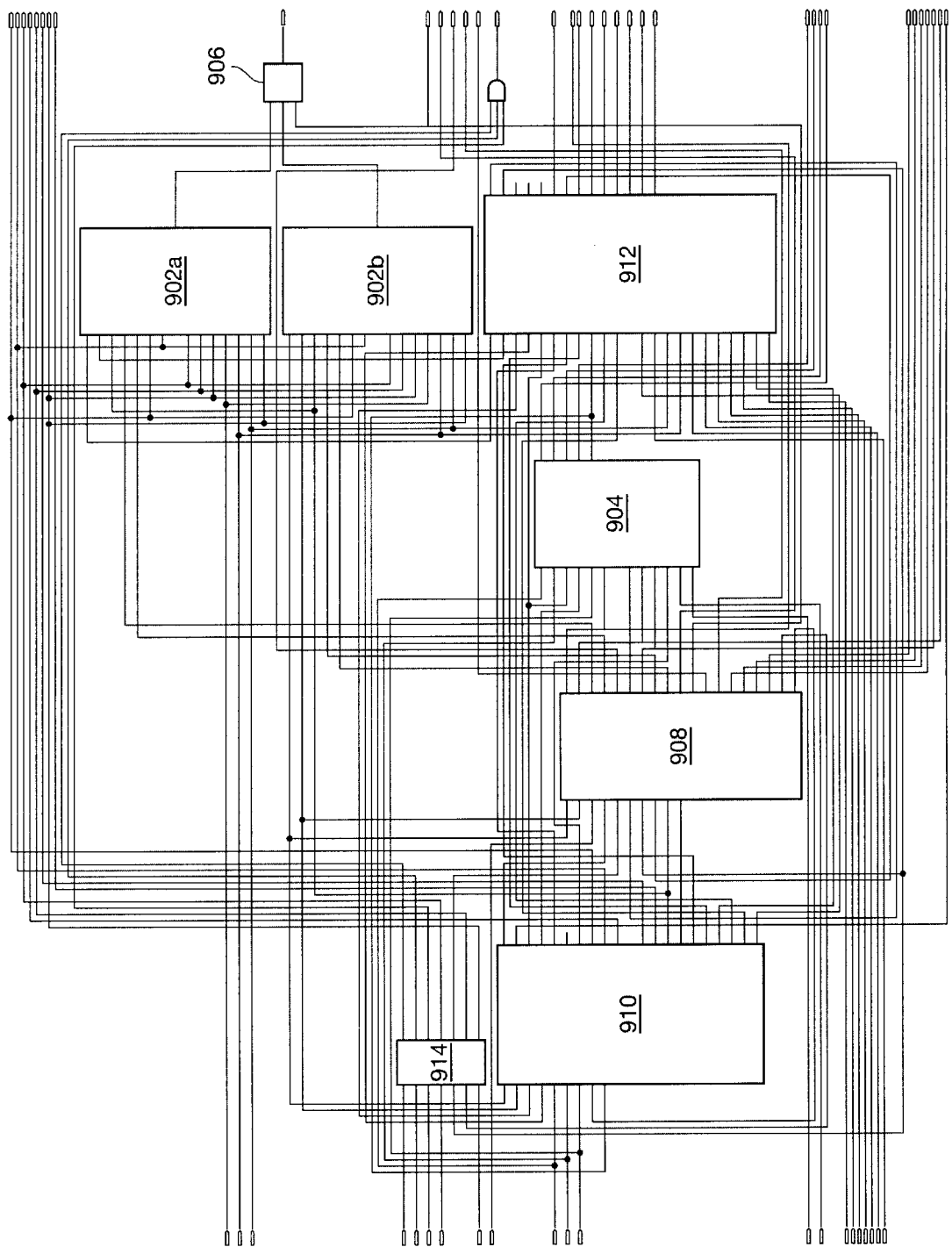

FIGS. 8 and 9 illustrate further details regarding embodiments of the present invention. FIG. 8 illustrates connections of three (3) memory modules 801*a–c*. The memory modules 801*a–b* can be used to store the packed compressed data. The memory modules 801*a–b* can each store one compressed video segment. The memory modules 801*a–b* can have any size, but are preferably 30 by 50-bits. The memory module 801*c* can be used to store the pointer for the packing of storage compartments which have already been partially filled with overflow data. The memory module 801*c* can have any size, but is preferably 30 by 7-bits.

Reading to and writing from the memory modules 801*a–b* can take place simultaneously. For example, first, a compressed video segment can be stored in the memory module 801*a*. Then, the next compressed video segment can be stored in the memory module 801*b*, while simultaneously reading the data stored in the memory module 801*a*. The data stored in the memory module 801*a* can be sent to other modules such as the system multiplexer 526 (shown in FIG. 5). Accordingly, reading and writing of the memory modules 801*a–b* can be overlapped. The memory modules 801*a–c* are coupled to a packing controller 803. The packing controller 803 can provide some logic for the packing operations.

FIG. 9 illustrates further details regarding the packing controller 803 of FIG. 8. Blocks 902*a–b* can be used to store the "Status & Quantization number" bytes of the two video segments being processed. The block 904 can be a multiplexer and can include some control logic to generate the write enable and write address for the memory modules 801*a–b* of FIG. 8. Block 906 can be a multiplexer for the two sets of "Status & Quantization number" bytes as mentioned above with respect to the blocks 902*a–b*.

Block 908 can be used to generate the control signals for other modules within FIG. 9. For example, it can control when to start each pass of the packing operation. For example, block 910 can be used to control the first pass of packing operation. Block 912 can be used to control the second pass of the packing operation. Block 914 can be used to control the third pass of the packing operation.

As will be understood by those with ordinary skill in the art, the present invention may be embodied in other specific forms without departing from the spirit or essential characteristics thereof. For example, the disclosed code packing techniques can be applied to different types of data, including audio data and the like.

Additionally, the techniques of the present invention can be implemented in a computer system. For example, the systems of the present invention can be implemented on a peripheral component interconnect (PCI) card. The PCI card can be installed onto the PCI bus of a personal computer. Also, other bus technologies such as NUBUS, ISA, EISA, Universal Serial Bus (USB), 1394 bus, and Accelerated Graphics Port (AGP) can also be utilized. Moreover, the techniques of the present invention can be implemented by utilizing the available routines and features such as caching, new instruction sets, and single instruction multiple data (SIMD) tools which are provided by Intel® Corporation's MMXʊ technology, Advance Micro Device,® Inc.'s 3DNow!ʊ technology, and their equivalents. Accordingly, for an understanding of the scope of the invention, reference should be made to the appended claims.

What is claimed is:

1. A method of transferring a data block to a storage device, the storage device having a plurality of compartments, comprising:

receiving a plurality of length values, each of the length values corresponding to a data block from a plurality of data blocks;

filling a first compartment of the storage device with a portion of data from a first data block;

searching the length values to identify one of the plurality of data blocks having a length value less than a threshold value; and filling a second compartment of the storage device with a remaining portion of the data from the first data block, the second compartment corresponding to the identified data block.

2. The method of claim 1 further comprising filling a second compartment of the storage device with a portion of data from a second data block.

3. The method of claim 1 further comprising filling a second compartment of the storage device with an entire portion of data from a second data block.

4. The method of claim 1 wherein the threshold value defines the storage capacity of at least one of the plurality of compartments.

5. The method of claim 1 wherein the length value represents the amount of data in a corresponding data block from the plurality of data blocks.

6. A method of transferring a data block to a storage device, the storage device having a plurality of compartments, the method comprising:

receiving a plurality of size values, each of the size values corresponding to a data block from a plurality of data blocks;

filling a first compartment of the storage device with data from a first data block;

searching the size values to identify one of the plurality of data blocks having a size value less than a threshold value; and filling a second compartment of the storage device with data from the first data block.

7. The method of claim 1 wherein the filling the first compartment is performed until the first compartment is substantially filled with data.

8. The method of claim 1 wherein the filling the first compartment is performed until the data from the first data block has been transferred to the storage device.

9. The method of claim 1 wherein the filling the second compartment is performed until the second compartment is substantially filled with data.

10. The method of claim 1 wherein the filling the second compartment is performed until the data from the first data block has been transferred to the storage device.

11. A system for transferring a data block to a storage device, the storage device having a plurality of compartments, the system comprising:

means for receiving a plurality of size values, each of the size values corresponding to a data block from a plurality of data blocks;

means for filling a first compartment of the storage device with data from a first data block;

means for searching the size values to identify one of the plurality of data blocks having a size value less than a threshold value; and means for filling a second compartment of the storage device with remaining data from the first data block.

12. An apparatus for transferring a data block to a storage device, the storage device having a plurality of compartments, the apparatus comprising:

a compression module configured to compress the data block;

a code packing module coupled to the compression module and configured to receive the compressed data block;

an encoder coupled to the code packing module and configured to provide a plurality of length values, each of the plurality of length values corresponding to a different compartment of the storage device, wherein the code packing module fills a first compartment of the storage device with at least a portion of data from the compressed data block, if all data from the compressed data block cannot be stored in the first compartment, then the code packing module searches the plurality of length values to identify a second compartment of storage device having a length value less than a threshold value, and then the code packing module fills a second compartment of the storage device with remaining data from the compressed data block.

* * * * *